(12) United States Patent
Zeiler et al.

(10) Patent No.: US 11,682,800 B2
(45) Date of Patent: Jun. 20, 2023

(54) BATTERY PACKS WITH CELL MODULE ASSEMBLIES USABLE IN MULTIPLE APPLICATIONS

(71) Applicant: BRIGGS & STRATTON, LLC, Wauwatosa, WI (US)

(72) Inventors: Jeffrey Zeiler, Brookfield, WI (US); Jacob Schmalz, Milwaukee, WI (US); Nick Zeidler, Brookfield, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 0 days.

(21) Appl. No.: 17/675,129

(22) Filed: Feb. 18, 2022

(65) Prior Publication Data

US 2022/0173445 A1 Jun. 2, 2022

Related U.S. Application Data

(63) Continuation of application No. 17/284,263, filed as application No. PCT/US2019/055692 on Oct. 10, 2019, now Pat. No. 11,258,114.

(Continued)

(51) Int. Cl.
*H01M 50/296* (2021.01)
*H01M 10/48* (2006.01)
(Continued)

(52) U.S. Cl.
CPC ....... *H01M 10/482* (2013.01); *H01M 10/486* (2013.01); *H01M 50/204* (2021.01); *H01M 50/213* (2021.01); *H01M 50/296* (2021.01); *H01M 50/298* (2021.01); *H01M 50/509* (2021.01); *H01M 50/512* (2021.01);
(Continued)

(58) Field of Classification Search
CPC ............. H01M 10/482; H01M 10/486; H01M 50/296; H01M 50/509; H01M 50/204; H01M 50/512
See application file for complete search history.

(56) References Cited

U.S. PATENT DOCUMENTS 9,430,021 B2   8/2016   Lu et al.
10,347,954 B2  7/2019   Rief et al.
(Continued)

OTHER PUBLICATIONS

International Search Report and Written Opinion regarding PCT Appl. No. PCT/US2019/055692, dated Feb. 11, 2020, 14 pps.

*Primary Examiner* — Jane J Rhee
(74) *Attorney, Agent, or Firm* — Foley & Lardner LLP (57) ABSTRACT

A cell module assembly includes multiple lithium-ion battery cells connected in parallel and an electronic controller. The electronic controller is programmed to receive useful life data for a useful life indicator of the battery cells, save the life data to memory to create a life data history, determine a life measurement based on the life data history, compare the life measurement to a first end of life threshold, determine if the life measurement has met the first end of life threshold, provide a first end of life output indicating that the life measurement has met the first end of life threshold, compare the life measurement to a second end of life threshold, determine if the life measurement has met the second end of life threshold, and provide a second end of life output indicating that the life measurement has met the second end of life threshold.

13 Claims, 9 Drawing Sheets

Related U.S. Application Data

(60) Provisional application No. 62/744,682, filed on Oct. 12, 2018.

(51) Int. Cl.
| | |
|---|---|
| *H01M 50/509* | (2021.01) |
| *H01M 50/204* | (2021.01) |
| *H01M 50/512* | (2021.01) |
| *H01M 50/213* | (2021.01) |
| *H01M 50/298* | (2021.01) |
| *A01D 69/02* | (2006.01) |
| *A01D 101/00* | (2006.01) |
| *A47L 11/40* | (2006.01) |
| *B60R 16/033* | (2006.01) |
| *B66F 9/075* | (2006.01) |
| *B66F 11/04* | (2006.01) |

(52) U.S. Cl.
CPC .......... *A01D 69/02* (2013.01); *A01D 2101/00* (2013.01); *A47L 11/4005* (2013.01); *B60R 16/033* (2013.01); *B66F 9/075* (2013.01); *B66F 11/04* (2013.01)

(56) References Cited

U.S. PATENT DOCUMENTS

| | | |
|---|---|---|
| 2009/0167543 A1 | 7/2009 | Bi |
| 2012/0274140 A1 | 11/2012 | Ganor |
| 2014/0242445 A1 | 8/2014 | Gozdz et al. |
| 2015/0318521 A1 | 11/2015 | Zeiler et al. |
| 2017/0108553 A1* | 4/2017 | Ganesan ............... G01R 31/396 |
| 2018/0205055 A1 | 7/2018 | Hilligoss et al. |
| 2019/0075724 A1 | 3/2019 | Becke et al. |

* cited by examiner

BATTERY PACKS WITH CELL MODULE ASSEMBLIES USABLE IN MULTIPLE APPLICATIONS

CROSS-REFERENCE TO RELATED PATENT APPLICATIONS

This application is a continuation of U.S. patent application Ser. No. 17/284,263 filed Apr. 9, 2021, which is a national stage of PCT Application No. PCT/US2019/055692 filed Oct. 10, 2019 which claims the benefit of Provisional U.S. Application 62/744,682, filed Oct. 12, 2018, the disclosures of which are incorporated herein by reference in their entireties.

BACKGROUND

The present disclosure relates generally to battery packs. More specifically, the present disclosure relates to reusing components of battery packs.

Battery packs may be used with different types of equipment, including outdoor power equipment, vehicles, aerial man lifts, floor care devices, golf carts, lift trucks and other industrial vehicles, aerial man lifts, floor care devices, recreational utility vehicles, industrial utility vehicles, lawn and garden equipment, and energy storage or battery backup systems. Outdoor power equipment includes lawn mowers, riding tractors, snow throwers, pressure washers, portable generators, tillers, log splitters, zero-turn radius mowers, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like.

SUMMARY OF THE INVENTION

One embodiment of an invention includes a cell module assembly including multiple lithium-ion battery cells connected in parallel and an electronic controller. The electronic controller is programmed to receive useful life data for a useful life indicator of the multiple lithium-ion battery cells, save useful life data to memory to create a useful life data history, determine a useful life measurement based on the useful life data history, compare the useful life measurement to a first end of life threshold, determine if the useful life measurement has met the first end of life thresh-old, and provide a first end of life output indicating that the useful life measurement has met the first end of life thresh-old. The electronic controller is also programmed to compare the useful life measurement to a second end of life threshold, determine if the useful life measurement has met the second end of life threshold, and provide a second end of life output indicating that the useful life measurement has met the second end of life threshold.

Another embodiment of an invention includes a cell module assembly including multiple lithium-ion battery cells connected in parallel and an electronic controller. The electronic controller is programmed to receive useful life data for multiple useful life indicators of the multiple lithium-ion battery cells, save useful life data to memory to create a useful life data histories, determine a useful life measurement based on the useful life data histories, compare the useful life measurement to a first end of life threshold, determine if the useful life measurement has met the first end of life threshold, and provide a first end of life output indicating that the useful life measurement has met the first end of life threshold. The electronic controller is also programmed to compare the useful life measurement to a second end of life threshold, determine if the useful life measurement has met the second end of life threshold, and provide a second end of life output indicating that the useful life measurement has met the second end of life threshold.

Another embodiment of an invention includes a battery pack including a housing and multiple cell module assemblies positioned within the housing. The housing includes a mounting plate, multiple trusses arranged in a frame defining multiple openings, and multiple panels, each panel positioned to close one of the multiple openings of the frame.

Alternative exemplary embodiments relate to other features and combinations of features as may be generally recited in the claims.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
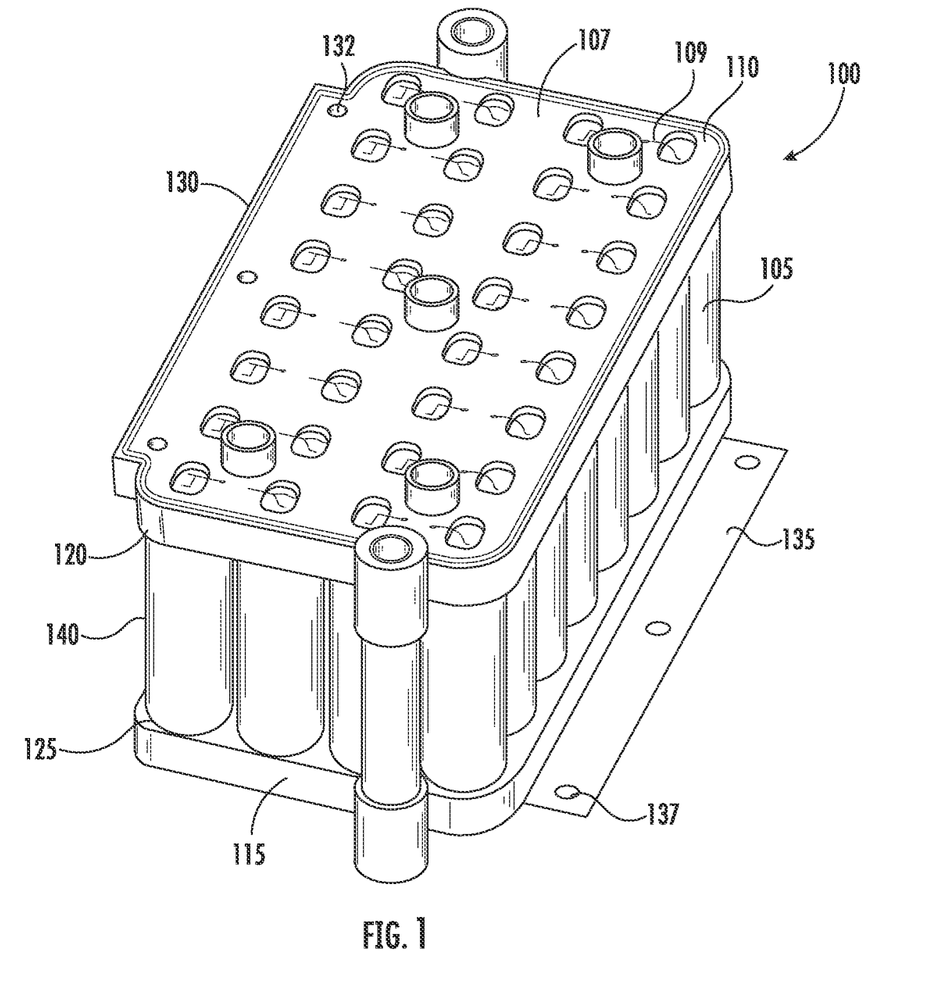
FIG. 1 is a perspective view of a cell module assembly.

Referring to FIG. 1, a cell module assembly ("CMA") 100 is illustrated according to an exemplary embodiment. The CMA 100 includes multiple battery cells 105. In some embodiments, the battery cells 105 are lithium-ion battery cells. In some embodiments the battery cells 105 are lithium-ion battery cells rated at 3.6 volts and 3 amp-hours. As illustrated, the CMA 100 includes thirty-two battery cells 105 arranged in four rows of eight cells each. The battery cells 105 are electrically connected to one another. In the illustrated embodiment, each battery cell 105 is electrically connected to a positive collector plate 107 by a wire bond 109 and electrically connected to a negative collector plate (not shown) by a wire bond (not shown). The battery cells 105 are connected to a top plate 110 and a bottom plate 115 with the positive terminals 120 of the battery cells 105 located at the top plate 110 and the negative terminals 125 of the battery cells 105 located at the bottom plate 115. The positive collector plate 109 is secured to the top plate 110 (e.g., by an adhesive). The negative collector plate is secured to the bottom plate 115 (e.g., by an adhesive). In some embodiments, all thirty-two battery cells 105 are connected in parallel in a 1S32P (one series, thirty-two parallel) arrangement. In other embodiments, two groups of sixteen battery cells 105 are connected in parallel with the two groups connected in series in a 2S16P (two series, sixteen parallel) arrangement. Arranging a relatively large number of battery cells 105 in parallel in this manner helps to slow the degradation of the charge capacity of the CMA 100. In other embodiments, the number of battery cells 105 in the CMA 100 may be greater or fewer and the connection arrangements between the battery cells 105 may vary depending on the ratings needed from a particular CMA (e.g., voltage, capacity, power, etc.).

The top plate 110 includes a positive terminal 130 for connection (e.g., with fasteners via holes 132) to another CMA 100 or to a positive bus (not shown) for electrically connecting the CMA 100 or a collection of CMAs 100 to device to be powered. The bottom plate 115 includes a negative terminal 135 for connection (e.g., with fasteners via holes 137) to another CMA 100 or to a negative bus (not shown) for electrically connecting the CMA 100 or a collection of CMAs 100 to device to be powered. In some embodiments, the top plate 110 is connected to the negative terminals 125 of the battery cells 105 and has a negative terminal 130 and the bottom plate 115 is connected to the positive terminals 120 of the battery cells 105 and has a positive terminal 135. In some embodiments, the terminals 130 and 135 are components of the collector plate (i.e., the positive collector plate 109 and the negative collector plate, respectively) used to electrically connect the battery cells 105 to each other. Each CMA 100 may be identified with an individual identifier (e.g., serial number, bar code, etc.) for use by the CMA manufacturer to track, categorize, evaluate, or record information or data about an individual CMA.

In some embodiments, the CMA 100 also includes an electronic controller 140. The electronic controller 140 can include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to processor via processing circuit and includes computer code for executing (e.g., by processing circuit and/or processor) one or more processes described herein.

The controller 140 also implements a battery management system (BMS) for regulating the currents and/or voltages involved in the charging and discharging processes in order to ensure that the battery cells 105 are not damaged or otherwise brought to problematic charge states. For example, the BMS may block an electrical current from being delivered to the cells 105, or may block a current being drawn from the cells 105 based on the current and voltage properties of the signal and/or of the CMA 100. The BMS may also implement controls based on a temperature as detected by a temperature sensor and regulate operation of the CMA 100 based on over temperature or under temperature conditions determined by the detected temperature.

Figure 2:
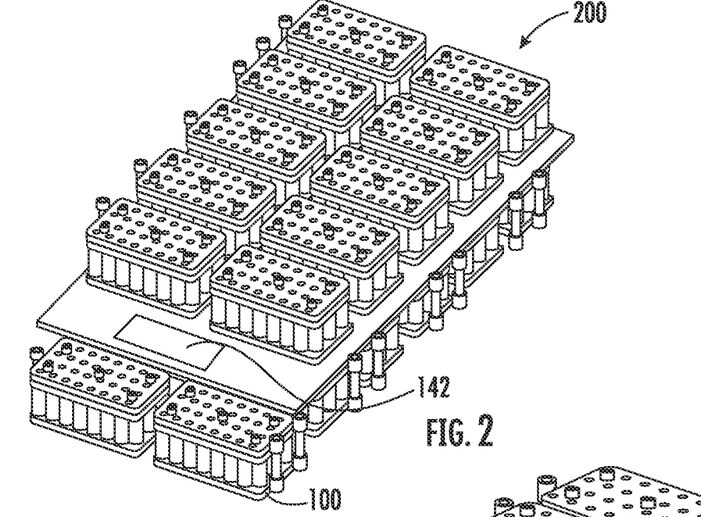
FIG. 2 is a perspective view of a first battery pack including multiple cell module assemblies of FIG. 1.
Figure 3:
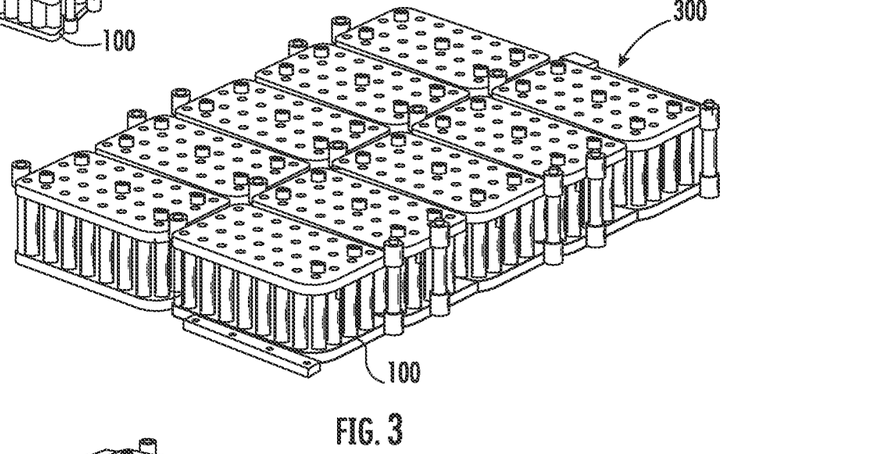
FIG. 3 is a perspective view of a second battery pack including multiple cell module assemblies of FIG. 1.
Figure 4:
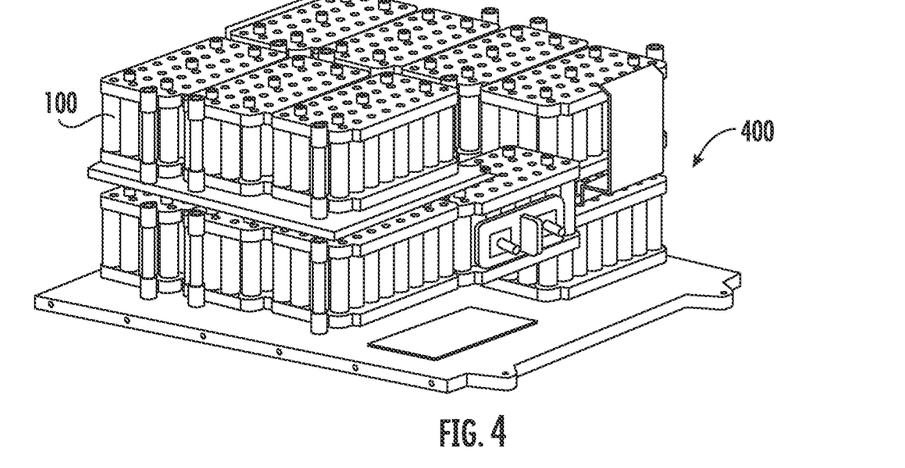
FIG. 4 is a perspective view of a third battery pack including multiple cell module assemblies of FIG. 1.

Referring to FIGS. 2-4, multiple CMAs 100 are combined with each other to form a battery pack suitable for a particular end use based on the number of CMAs 100 used, how the CMAs 100 are connected to each other, and the available physical space (e.g., volume or footprint) for the battery pack. For example, battery pack 200 is rated at 48 volts and 7.2 kilowatt-hours, battery pack 300 is rated at 36 volts and 3.7 kilowatt-hours, and battery pack 400 is rated at 48 volts and 5.1 kilowatt hours. In this way, the CMA 100 serves as a single unit "building block" for assembling battery packs with different ratings and of different sizes for use in particular applications. This flexibility allows a battery pack to be customized for its particular application while using the same CMA building block across multiple battery pack applications. Battery pack 200 includes two layers of CMAs 100 and is relatively long with the bottom layer consisting of two rows of eight CMAs 100 and the top layer consisting of two rows of six CMAs 100. Battery pack 400 also includes two layers of CMAs but has a shorter length than battery pack 200 by being arranged in two identical layers consisting of one row of four CMAs 100 next to a second row of three CMAs 100. Battery pack 300 is a flat arrangement with a single layer consisting of two rows of five CMAs 100. Each battery pack may be identified with an individual identifier (e.g., serial number, bar code, etc.) for use by the CMA manufacturer to track, categorize, evaluate, or record information or data about an individual battery pack and the particular CMAs used in that battery pack.

Figures 5, 6:
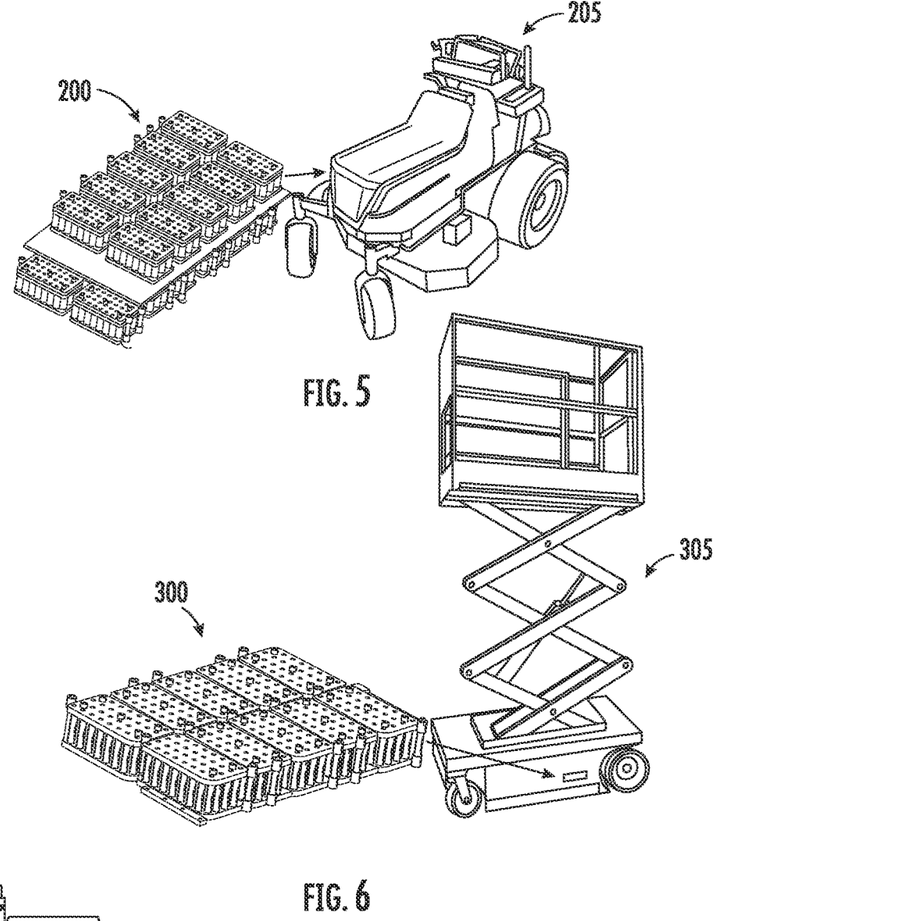
FIG. 5 is a perspective view of the battery pack of FIG. 2 and a lawn mower capable of using the battery pack.
FIG. 6 is a perspective view of the battery pack of FIG. 3 and an aerial man-lift capable of using the battery pack.
Figure 7:
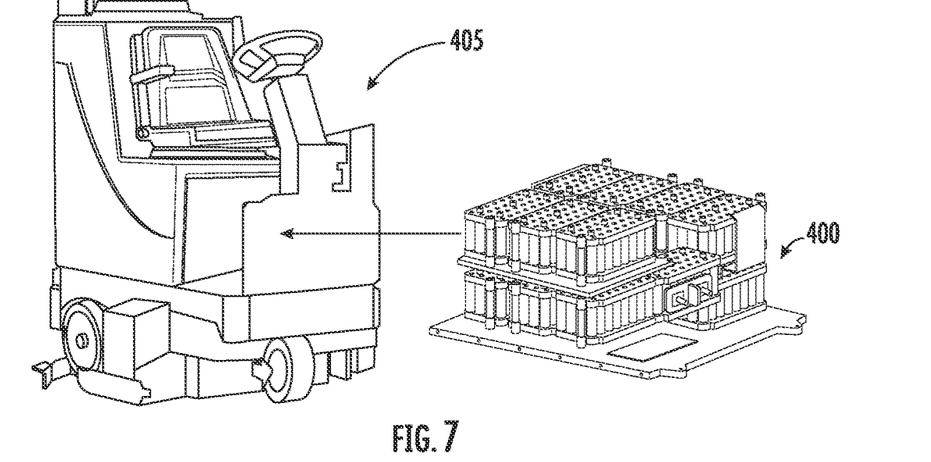
FIG. 7 is a perspective view of the battery pack of FIG. 4 and a floor cleaner capable of using the battery pack.
Figure 8:
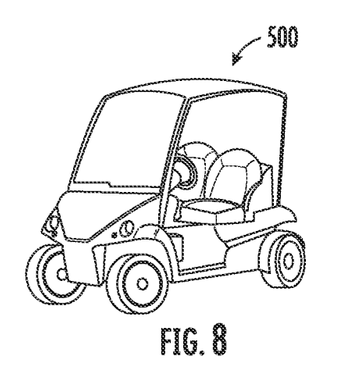
FIG. 8 is a perspective view of a golf cart, according to an exemplary embodiment.
Figure 9:
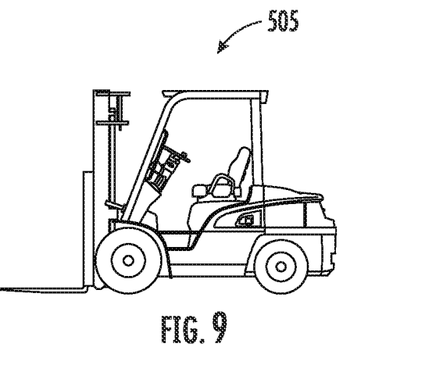
FIG. 9 is a perspective view of a lift truck, according to an exemplary embodiment.
Figure 10:
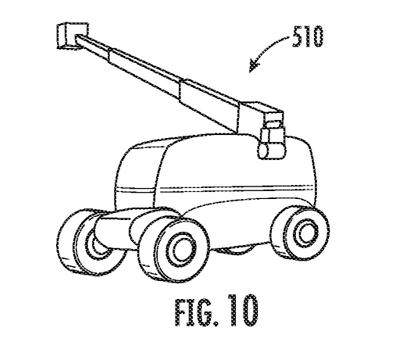
FIG. 10 is a perspective view of an aerial man lift, according to an exemplary embodiment.
Figure 11:
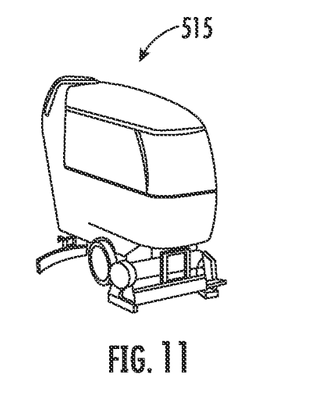
FIG. 11 is a perspective view of a floor care device, according to an exemplary embodiment.
Figure 12:
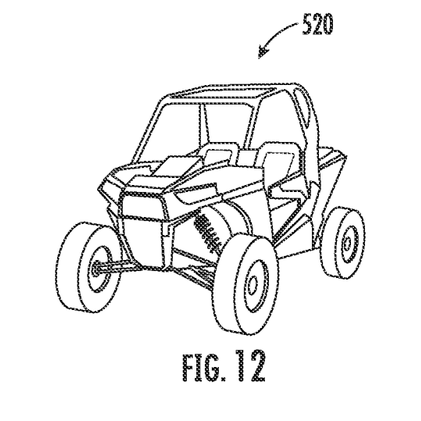
FIG. 12 is a perspective view of a recreational utility vehicle, according to an exemplary embodiment.
Figure 13:
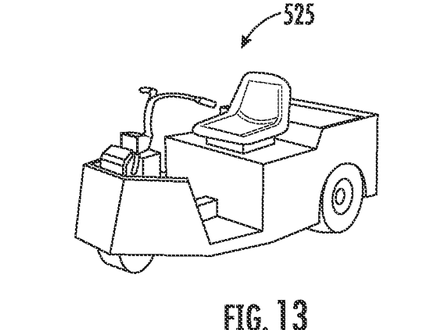
FIG. 13 is a perspective view of an industrial utility vehicle, according to an exemplary embodiment.

Referring to FIGS. 5-7, different battery packs are suitable for use to power different equipment. The use of CMAs allows a battery pack to be customized for use with a particular piece of equipment. The battery pack 200 could be used in a lawn mower 205, illustrated as a commercial zero-turn lawn mower. The battery pack 300 could be used in a scissors-style aerial man lift 305, or other industrial lift equipment or aerial work platforms. The battery pack 400 could be used in a floor cleaner 405. These or other battery packs could be used in other equipment as illustrated in FIGS. 8-13, including golf carts 500, lift trucks 505, aerial man lifts 510, floor care devices 515, recreational utility vehicles 520, and industrial utility vehicles 525. These or other battery packs could also be used in other lawn and garden equipment, automobiles, motorcycles, and energy storage or battery backup systems.

The maximum charge capacity of the cells 105 of the CMAs 100 of a battery pack decay of over the life of the battery pack as the battery pack ages. This decay is caused by the battery pack being cycled by discharging and then recharging the battery pack, changes in temperature (e.g., high temperatures), and degradation of the chemistry of the battery cells. A cycle is the transition from the battery pack's fully charged state (as allowed by the BMS) to its fully discharged state (as allowed by the BMS). As the number of cycles increases over the life of the battery pack the battery pack's maximum charge capacity declines.

For example, the initial charge capacity of a battery pack, which is identified as 100% charge capacity, may degrade to about 70% charge capacity after two thousand cycles. This reduction in charge capacity results in a corresponding reduction in the battery pack's energy rating so that a battery pack initially rated at 7.2 kilowatt-hours would be reduced to 5.04 kilowatt-hours when the battery pack is degraded to 70% charge capacity. For the battery pack 200, which is suitable for use in a commercial lawn mower (e.g., the zero-turn lawn mower of FIG. 5), reduction in the battery pack 200's energy rating means less energy available to operate the mower and fewer jobs completed with the mower on a single charge of the battery pack 200. If a day's operation of the commercial lawn mower is considered to be one cycle of the battery pack 200 (even though each day may not result in the battery pack 200 transitioning from the fully charged state to the fully discharged state) and the commercial lawn mower is used in a temperate environment where lawn mowing services are required year round, then the battery pack 200 would not be reduced to 70% charge capacity until almost five and one half years of operation (i.e., 2000 cycles divided by 365 days in a year). However, the practical life span of the commercial lawn mower itself is less than this, about three and one half to four years, resulting in a battery pack with useful life remaining when the equipment it was powering has reached the end of its life.

This presents an opportunity to reuse the CMAs 100 used to power equipment that has reached the end of its life for use to power different equipment. For example, if 70% charge capacity is considered the end of a first life for the battery pack 200 where it is no longer suitable for use to power a commercial lawn mower, the battery pack 200 still is capable of producing about 5 kilowatt-hours and the CMAs making up the battery pack 200 can be reconditioned and put to use with equipment with lower energy demands than a commercial lawn mower (e.g., an aerial man lift, an industrial utility vehicle, a home energy storage system, etc.).

The electronic controller 140 of each CMA 100 is programmed to store data related to the operation of that CMA 100 and to use that data to determine a useful life measurement for that CMA 100. The useful life measurement may be expressed in terms of a percentage of life (e.g., the CMA is at 100% life when brand new). The useful life measurement may be used to set multiple end of life thresholds tied to certain applications for the CMA. In the example above for the battery pack 200, a CMA 100's first life would extend between 100% and 70% charge capacity and the battery pack 200 would be suitable for use powering a commercial lawn mower while its CMAs are within that first life. After the end of the first life (e.g., a useful life measurement below 70%), a CMA 100 could be reconditioned and put to use in its second life (e.g., between 70% and 50%) in which the CMA 100 is suitable for use in a battery pack for equipment having lower energy requirements than the equipment powered by the CMA 100 during its first life.

The useful life measurement can be determined by a number of data points indicative of useful life that can be monitored and saved by the electronic controller 140. These useful life indicators include charge capacity, days or other time elapsed since a commissioning date when the CMA 100 is first put into service, number of cycles since the commissioning date, depth of cycle for individual cycles or groups of cycles, an electrical charge tracker that counts the number of coulombs supplied by the CMA 100 since the commission date, an event counter of operation of the CMA 100 in extreme temperature conditions (e.g., above 140 degrees Fahrenheit) for individual events or groups of events, the current supplied by the CMA 100, the current received by the CMA 100 for charging, the voltage supplied by the CMA 100, and/or the voltage applied to the CMA 100 during charging. In different embodiments, different combinations of useful life indicators are monitored and saved by the electronic controller 140. The useful life indicators identified above may be monitored individually in some embodiments or monitored in any combination in other embodiments. In other embodiments, useful life indicators are tracked and stored for each individual battery cell 105 of the CMA 100.

Gathering and tracking useful life indicators across the life of the CMA rather than a single instantaneous reading indicative of the end of life (e.g., 70% charging capacity) provides additional information to classify a CMA 100 for reconditioning to an appropriate use. In some embodiments, not every data point associated with a useful life indicator is stored, for example temperature may be sampled and stored on a weekly basis rather than daily basis. CMAs may be classified where different classifications are suitable for use in different second lives or based on different expected future performance in the second life as determined by the evaluation of the useful life indicators from the first life. Tracking useful life indicators also provides the CMA manufacturer with data that can be used for diagnostics to determine why a particular CMA performs better or worse than a similar CMA and then use that diagnostic information to improve manufacturing or other processes for new CMAs.

For example, a CMA 100 with 70% charging capacity, but a relatively high number of days operated in extreme temperature conditions may have a charging capacity degrade at a faster rate than a CMA 100 with a 70% charging capacity and no days operated in extreme temperature conditions. Both CMAs 100 may be suitable for reconditioning and use in their second lives, but the appropriate uses for the two CMAs in their second lives may be different based on their classification resulting from evaluation of their respective useful indicators. Tracking and storage of useful life indicators can also be used to evaluate returned or warrantied battery packs, fix or refurbish battery packs returned within their first life, and improve manufacturing processes by comparing various CMAs to one another.

The useful life indicators are used to identify when a CMA 100 has reached an end of life threshold. The CMA 100 may have multiple end of life thresholds. For example, the CMA 100 may be suitable for use in a first application during the span of its first life (e.g., a commercial lawn mower). When the CMA 100 reaches its first end of life threshold (e.g., 80%, 75%, 70%, etc. of its useful life), the CMA 100 is taken out of service for the first application and returned to the CMA manufacturer. The CMA manufacture then categorizes or classifies the CMA 100 based on its useful life data to identify a suitable second life application for that particular CMA 100. If necessary, that CMA 100 is reconditioned or refurbished and then combined with other similarly classified CMAs to form a battery pack for use in a second life application. This new battery pack can be used in the second life application until the CMA reaches a second end of life threshold (e.g., 50%, 45%, 40%, etc. of its useful life). This method of using the same CMA for different applications based on the CMA's life cycle allows the CMA manufacturer to make more complete use of the CMA's available capacity by using the CMA in multiple applications rather than having a CMA at the end of its first life discarded and not make use of the remaining battery capacity.

The CMA manufacturer may lease battery packs consisting of multiple CMAs to the user of the equipment powered by the battery pack. This approach would enable the user of the CMA during its first life to return the battery pack at the end of its first life to the CMA manufacturer, allowing the CMA manufacturer to classify the CMAs and reuse them for second life applications, where the resulting battery packs could again be leased or sold to the user of the equipment powered by the battery pack consisting of CMAS in their second life. Alternatively, the CMA manufacture can sell the battery packs consisting of CMAs and buy back the battery packs at the end of the first life of the CMAs for classification and reuse in a second life application.

Referring to FIG. 2, in some embodiments, an electronic controller 142 is provided for the entire battery pack 200, not for a single CMA 100 as described with respect to FIG. 1. The battery pack electronic controller 142 performs the same functions described herein for the CMA electronic controller 140 on a battery pack-wide basis rather than on a CMA-wide basis. The useful life indicators and other categorization and data storage functions described herein are performed by the electronic controller 142 and are associated with each of the CMAs 100 that make up the specific battery pack.

Figure 14:
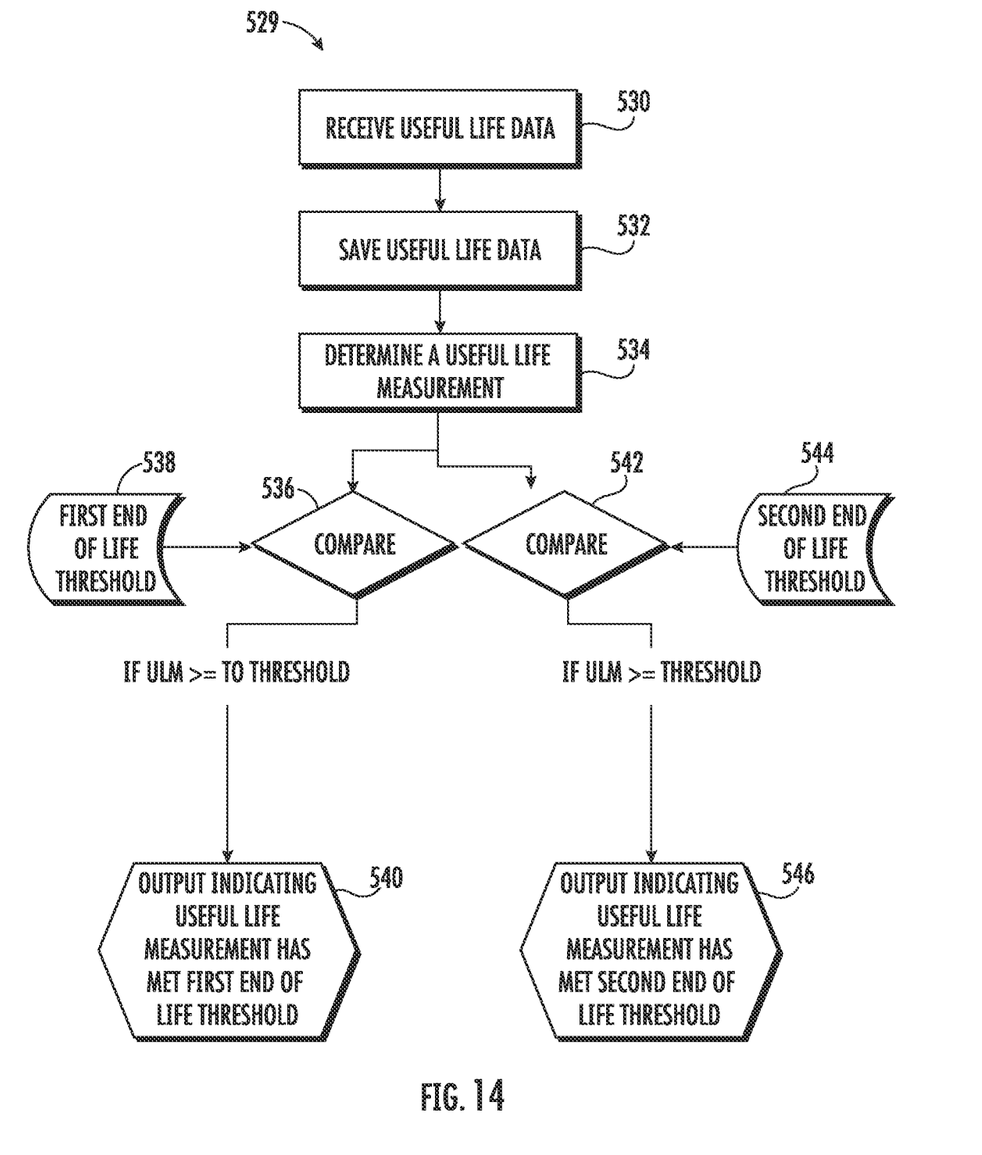
FIG. 14 is a flow chart for a method of evaluating a cell module assembly, according to an exemplary embodiment.

Referring to FIG. 14, a method of evaluating a CMA 529 is illustrated according to an exemplary embodiment. In step 530, an electronic controller (e.g., electronic controller 140 or electronic controller 142) receives useful life data. In step 532, the useful life data is saved (e.g., to a memory of the electronic controller). In step 534, a useful life measurement is determined from the useful life data (e.g., as described above). In step 536, the useful life measurement is compared to a first end of life threshold (item 538) and if the useful life measurement is greater than or equal to the first end of life threshold, an output (item 540) indicating the useful life measurement has met the first end of life threshold is generated (e.g., by the electronic controller). The CMA that has been determined to be at or past the first end of life threshold may be removed from service (e.g., by removing the battery pack it is part of from service) and then categorized for use in a suitable second life application. In step 542, the useful life measurement is compared to a second end of life threshold (item 544) and if the useful life measurement is greater than or equal to the second end of life threshold, an output (item 546) indicating the useful life measurement has met the second end of life threshold is generated (e.g., by the electronic controller). In some embodiments, step 542 is only performed on a CMA in use for its second life or on a battery pack including one or more CMAs in use for their second life. The CMA that has been determined to be at or past the second end of life threshold may be removed from service (e.g., by removing the battery pack it is part of from service) and then disposed of or categorized for use in a suitable third life application.

Figure 15:
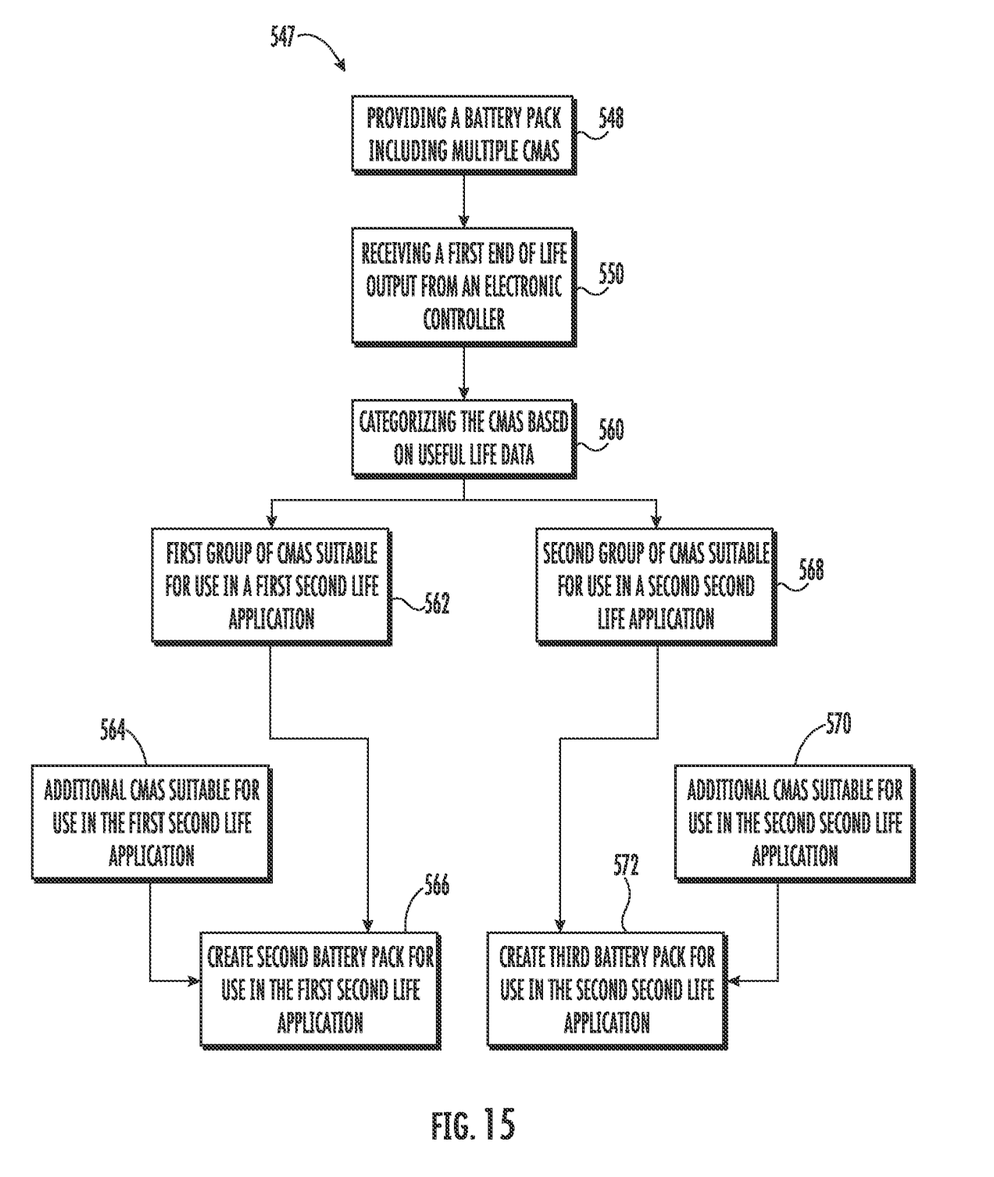
FIG. 15 is a flow chart for a method of reusing a component of a battery pack, according to an exemplary embodiment.

Referring to FIG. 15, a method of reusing a component (e.g., a CMA) of a battery pack 574 is illustrated according to an exemplary embodiment. In step 548, a battery pack including multiple CMAs is provided (e.g., by a CMA manufacturer). The CMA manufacturer will provide multiple such battery packs, but the method is described with reference to a single battery pack for exemplary purposes. In step 550, a first end of life output is received from an electronic controller (e.g., according to the method 539 described above). The battery pack is removed from service (e.g., by the CMA manufacturer or by the battery pack customer returning the battery pack to the CMA manufacturer). The CMAs are evaluated and categorized based on useful life data for use in a suitable second life application in step 560. This identifies one or more CMAs suitable for use in a first second life application (item 562). This group of CMAs is combined with additional CMAs suitable for use in the first second life application (item 564) to create a second battery pack for use in the first second life application (step 566). Step 560 may also identify one or more CMAs suitable for use in a second life application (item 568). This group of CMAs is combined with additional CMAs suitable for use in the second life application (item 570) to create a second battery pack for use in the first second life application (step 572). In some embodiments, all CMAs from the same battery pack may be categorized for use in the same second life application. For example, this may occur in battery packs that use a battery pack electronic controller 142 that saves the same data for each CMA used in that battery pack.

Referring to FIGS. 16-20, each battery pack may be protected by and positioned within a housing 600 that is customizable to accommodate the size of a particular battery pack. The housing 600 includes a bottom mounting plate 605 including projections or bosses 610. In some embodiments, the mounting plate 605 is formed from aluminum, which can facilitate heat rejection from the battery pack. A frame 615 formed of multiple support members or trusses 620 is attached to the mounting plate 605 at the bosses 610. In some embodiments, the trusses 620 are hollow tubes (e.g., round tubes or square tubes) that provide rigidity and support at a lower weight than a solid truss.

Figure 16:
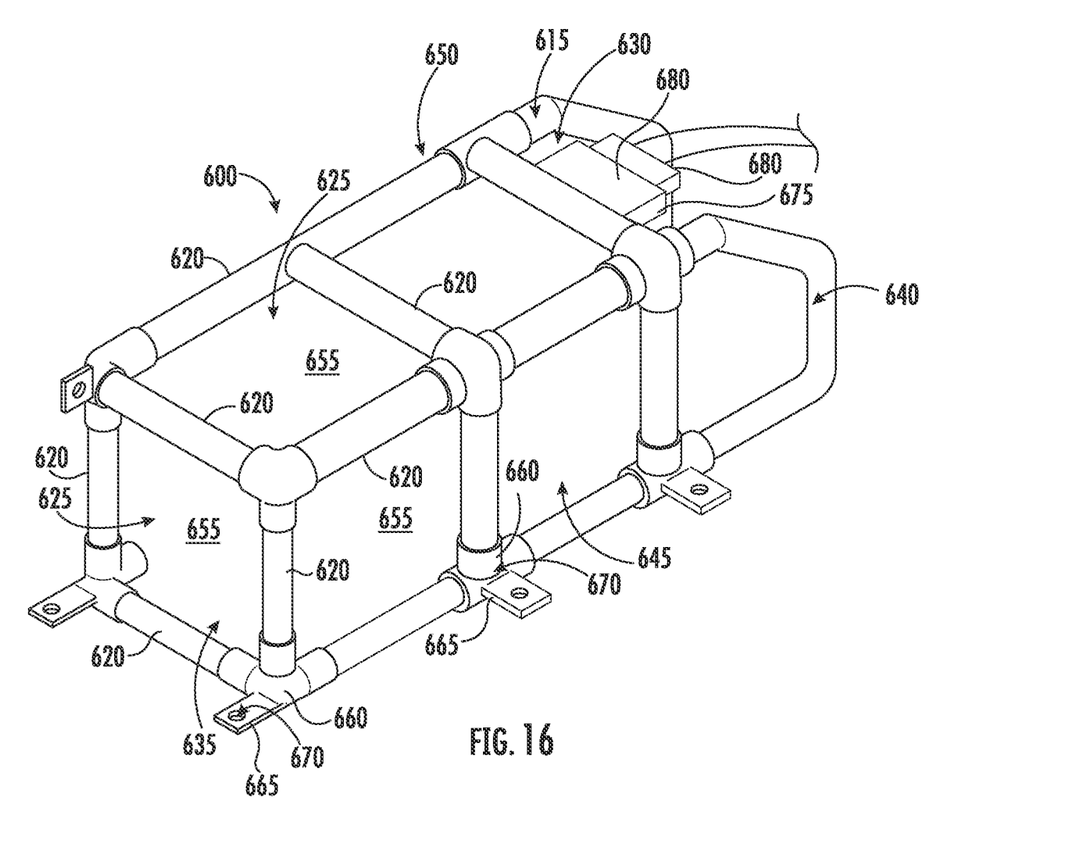
FIG. 16 is a perspective view of a housing for use with a battery pack, according to an exemplary embodiment.

The frame 615 forms a lattice of adjacent sections 625 defined by at least three trusses 620. In different embodiments, the sections 625 are triangles, rectangles, squares, other quadrilaterals, or polygons with more than four sides. In some embodiments, the trusses 620 of a section 625 are positioned not perpendicular to each other so that at least one truss 620 is provided at angle relative to an adjacent truss that is not ninety degrees, thereby presenting an angled truss that is suitable for use as a hoisting point for lifting and maneuvering the housing 600 and the battery pack within. In some embodiments, the housing 600 and the battery pack it contains weigh about one hundred fifty pounds and dedicated hoisting locations.

Figure 17:
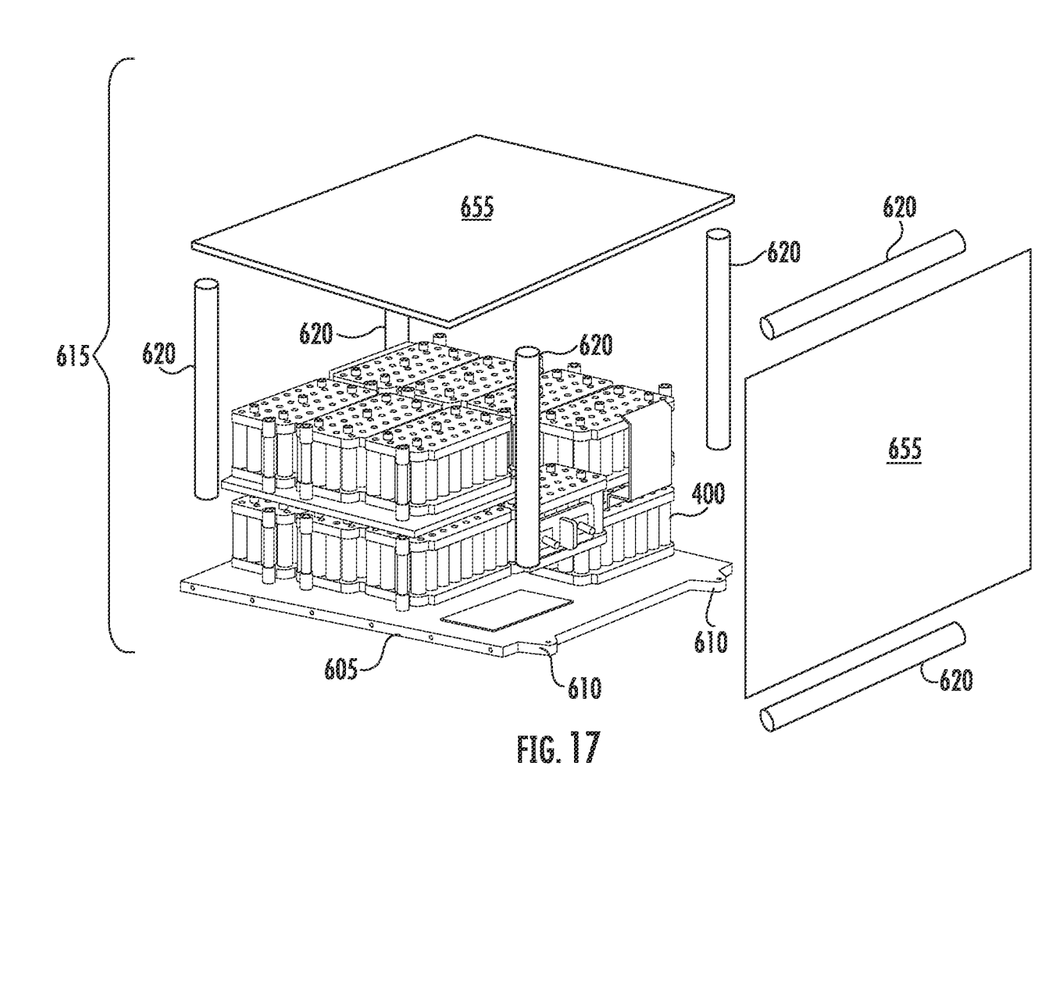
FIG. 17 is an exploded perspective view of a housing and a battery pack, according to an exemplary embodiment.

As illustrated, the frame 615 has top portion 630, a front portion 635, a rear portion 640, a left side portion 645, and a right side portion 650 so that the frame 615 in combination with the mounting plate 605 forms a rectangular housing 600 suitable for use with a rectangular or substantially rectangular battery pack, like the battery pack 400 illustrated in FIG. 17. The housing for different battery packs may take different shapes. For example, the housing for battery pack 200 may have a stepped profile that matches the stepped shape of the two layers of CMAs 100 that make up the battery pack 200.

The top portion 630 formed of sections 625 provides protection from crushing to the battery due to the trusses 620 arranged across the top portion 630 between the left side portion 645 and the right side portion 650. These trusses 620 act as cross members that would not be present if the top portion of the frame were a single large rectangle and not formed from multiple sections 625.

Figure 18:
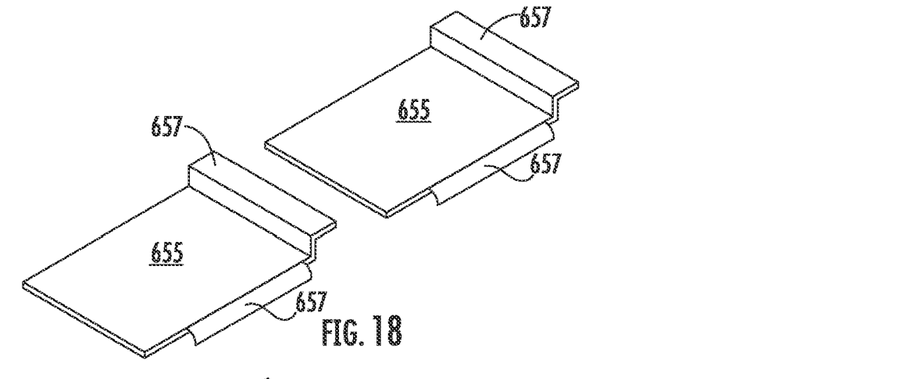
FIG. 18 is a perspective view of two panels of a housing, according to an exemplary embodiment.
Figure 19:
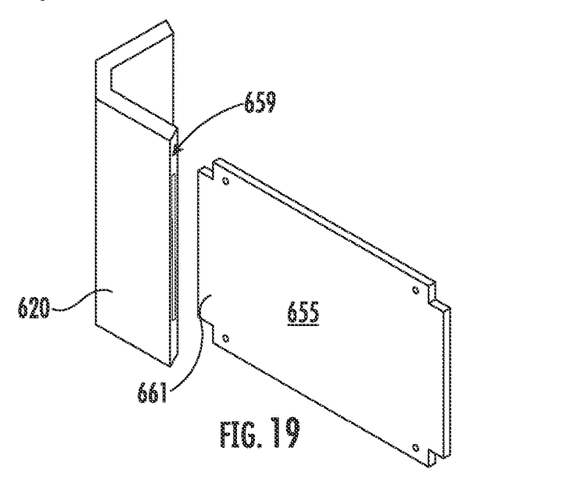
FIG. 19 is a perspective view of a truss and a panel, according to an exemplary embodiment.

Panels 655 are attached to each section 625 to close the opening of the section 625 and thereby protecting the battery pack from moisture, debris, and other unwanted access to the battery pack. The panels 655 may be formed from a polymer or plastic (e.g., by thermoforming, blow molding, injection molding, etc.). As shown in FIG. 18, in some embodiments, each panel 655 has projections 657 that are used to form an overlap joint between adjacent panels or between a panel and a truss 620. The projection 657 overlaps an adjacent panel or a truss and can be secured to the panel by a fastener, an adhesive, or other appropriate attachment mechanism. As shown in FIG. 19, in some embodiments, a truss 620 includes a slot or aperture 659 for receiving a portion 661 of a panel 655 to secure the panel 655 to the truss 620.

In some embodiments, the frame 615 includes connecting couplings or members 660 (e.g., corner couplings, tee couplings, etc.) that connect the trusses 620 to one another to form the frame 615. The connecting couplings 660 may include bosses or projections 665 including an opening 670 for securing the housing 600 to the mounting plate 605 (e.g., with bolts or other fasteners), securing the housing 600 in place on a piece of equipment, for attaching a device to hoist or move the housing 600 (e.g., a hook or strap), or other attachment purposes.

The housing 600 includes one or more electrical ports 675 to connect the battery pack to the equipment to be powered by the battery pack. The port(s) 675 allow connection of one or more cables 680 to the battery pack for the transfer of electricity to and from the battery pack. In some embodiments, data is also transferred to and from the battery pack via a port 675 and cable 680.

Figure 20:
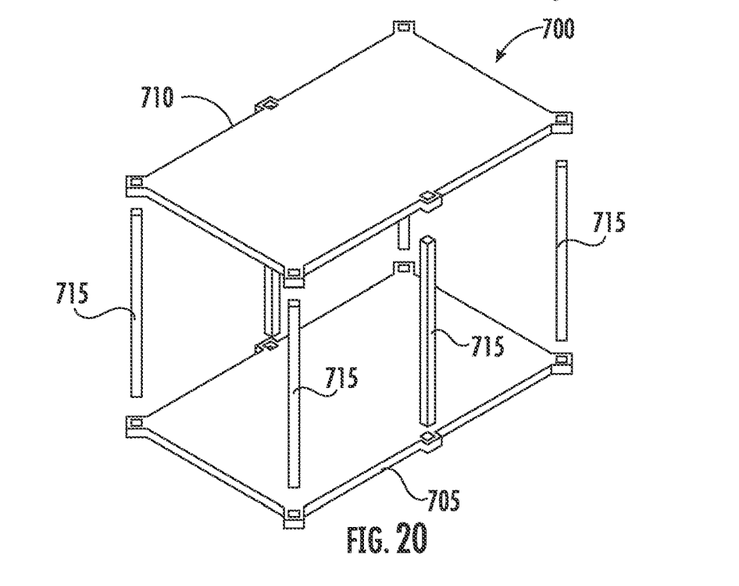
FIG. 20 is a perspective view of a housing for use with a battery pack, according to an exemplary embodiment.

As shown in FIG. 20, in alternative embodiments, a housing 700 is formed by two plates—bottom or mounting plate 705 and top plate 710 with vertically arranged trusses 715 connecting the bottom plate 705 to the top plate 710. The openings between the trusses 715 may be closed panels in a manner similar to that described for the housing 600.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field pro device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein. The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A method of evaluating a cell module assembly, comprising:
    collecting, by an electronic controller, useful life data for a cell module assembly;
    storing, by the electronic controller, the useful life data collected for the cell module assembly;
    determining, by the electronic controller, a useful life measurement for the cell module assembly based on the useful life data;
    comparing, by the electronic controller, the useful life measurement for the cell module assembly to a first end of life threshold;
    determining, by the electronic controller, that the useful life measurement for the cell module assembly is greater than or equal to the first end of life threshold;
    in response to determining that the useful life measurement for the cell module assembly is greater than or equal the first end of life threshold, removing the cell module assembly from service for a first life application; and
    determining that the cell module assembly is suitable for a second life application in response to determining that the useful life measurement of the cell module assembly is greater than or equal to the first end of life threshold and determining that the useful life measurement for the cell module assembly is less than or equal to a second end of life threshold.

2. The method of claim 1, further comprising:
    following determining that the useful life measurement for the cell module assembly is greater than or equal the first end of life threshold, comparing the useful life measurement for the cell module assembly to a second end of life threshold;
    determining that the useful life measurement for the cell module assembly is greater than or equal to the second end of life threshold; and
    in response to determining that the useful life measurement for the cell module assembly is greater than or equal the second end of life threshold, removing the cell module assembly from service of the second life application.

3. The method of claim 2, wherein the second end of life threshold is less than the first end of life threshold.

4. The method of claim 1, wherein the useful life data comprises at least one of a charge capacity, time passed since commissioning the cell module assembly, a number of charge cycles since commissioning the cell module assembly, a depth of a charge cycle, a number of coulombs supplied by the cell module assembly, a number of times the cell module assembly was operated during extreme weather conditions, a measurement of the current supplied to charge the cell module assembly, a measurement of the voltage supplied to charge the cell module assembly, and a measurement of the voltage supplied by the cell module assembly.

5. The method of claim 4, further comprising collecting and storing useful life data throughout a life of the cell module assembly.

6. The method of claim 4, further comprising storing a portion of the useful life data temporarily and discarding the portion of the useful life data after a predetermined period of time.

7. The method of claim 1, further comprising collecting the useful life data for each individual battery cell when the cell module assembly comprises a plurality of individual battery cells.

8. The method of claim 1, further comprising comparing, by a diagnostic tool the performance of the cell module assembly with a different cell module assembly based on the useful life data of the cell module assembly and the different cell module assembly.

9. The method of claim 1, wherein the first life application includes at least one of a riding lawn mower and a commercial lawn mower.

10. The method of claim 1, wherein the second life application includes at least one of a push lawn mower, a gardening equipment, an aerial man lift, a home energy storage system, a floor cleaner, and an industrial utility vehicle.

11. A method of manufacturing a battery pack, comprising:
    providing a battery pack including a plurality of cell module assemblies and an electronic controller;
    receiving a first end of life output from the electronic controller;
    removing the battery pack from service; and
    categorizing the cell module assemblies based on useful life data saved to the electronic controller into a first plurality of returned cell module assemblies suitable for use in a first suitable second life application and a second plurality of returned cell module assemblies suitable for use in a second suitable second life application.

12. The method of claim 9, further comprising:
    combining the first plurality of returned cell module assemblies with a plurality other similarly categorized cell module assemblies to form a second battery pack for use in the first suitable second life application.

13. The method of claim 11, further comprising:
    combining the second plurality of returned cell module assemblies with a plurality other similarly categorized cell module assemblies to form a third battery pack for use in the second suitable second life application.

* * * * *